(12) United States Patent  (10) Patent No.: US 8,329,272 B2
Cesternino  (45) Date of Patent: Dec. 11, 2012

(54) CARBON FIBER REINFORCED BEAM

(76) Inventor: Anthony John Cesternino, Callaway, VA (US)

( * ) Notice: Subject to any disclaimer, the term of this patent is extended or adjusted under 35 U.S.C. 154(b) by 0 days.

(21) Appl. No.: 13/050,996

(22) Filed: Mar. 18, 2011

(65) Prior Publication Data

US 2011/0167759 A1   Jul. 14, 2011

Related U.S. Application Data

(63) Continuation-in-part of application No. 12/229,231, filed on Aug. 21, 2008, now abandoned.

(51) Int. Cl.
*B32B 1/08* (2006.01)
*B32B 15/08* (2006.01)
*E04C 3/00* (2006.01)
*E04B 1/00* (2006.01)

(52) U.S. Cl. ............... 428/36.8; 428/35.7; 428/35.8; 428/36.4; 428/36.9; 428/36.91; 52/834; 52/835; 52/854; 52/742.1

(58) Field of Classification Search ............... 428/34.1, 428/34.4–34.7, 35.7–36.2, 36.4, 36.9, 36.91; 52/834, 835, 854, 742.1
See application file for complete search history.

(56) References Cited

U.S. PATENT DOCUMENTS 7,128,094 B2 * 10/2006 Anderson et al. ............. 137/615
2006/0283133 A1 * 12/2006 Westre et al. ................. 52/729.1

* cited by examiner

*Primary Examiner* — Walter B Aughenbaugh
(74) *Attorney, Agent, or Firm* — Charles T. Joyner

(57) ABSTRACT

The present invention is a structural beam having at least one composite core within a hollow beam of metal or polymeric material, i.e. a jacket, and a layer of elastomeric material between the composite core and the inner walls of the metal or polymeric jacket. This structural beam also may be fitted with brackets or holes at its ends and points along its length to allow attachment to other structural elements. The present beam provides a synergism between the properties of its composite core and the metal or polymeric jacket, and is particularly useful where a high strength to weight ratio is required.

14 Claims, 3 Drawing Sheets

CARBON FIBER REINFORCED BEAM

RELATED APPLICATION

This application is a continuation-in-part of U.S. patent application Ser. No. 12/229,231 filed on Aug. 21, 2008 now abandoned.

BACKGROUND OF THE INVENTION

1. Field of the Invention

This invention relates to a carbon fiber reinforced structural beam

2. Description of Related Art

Carbon fiber reinforced polymer (CFRP) composite, also know simply as "composite", is not only very strong but light weight as well. Typically, layers of woven or non-woven fabric of carbon fibers are placed in a matrix of a polymer such as epoxy, polyester, polyamide, or polyvinyl. In this regard, composites are similar to the widely employed fiberglass reinforced polymer. Composites are becoming the material of choice for aircraft, high performance automotive applications, machine parts, and sporting gear. As the relative cost of composites drops with the development of more efficient manufacturing techniques, we will, no doubt, see a greater use of composites in future.

In recent years, civil engineers have increasingly used CFRP as a means to reinforce concrete, wood, and metal structural elements. See for example, Buell, et al., *Journal of Structural Engineering*, vol. 131, No. 1, pp 173-187 (2005), U.S. Pat. No. 7,100,336, US patent, and Japanese patent JP 2001-020461A. Currently, composite structural beams are available in the various shapes that mimic metal beams.

While the strength and light weight of composite beams are attractive, connecting such composite beams both with other composite elements and with metal elements is problematic. They can not be welded like metal beams and bolting or riveting can lead to stress fractures, which subsequently lead to failure of the beam. Special fittings can be used to join composite elements, but require special techniques, with which construction workers are often not familiar, thus slowing assembly. Further, exposed composite beams are often subject to cuts and abrasion, particularly during construction, leading to future failure of the beam. Composite beams degrade when exposed to ultra-violet light, so they must be shielded from direct sun light. For example, U.S. Pat. No. 4,654,242 teaches a multi-layer composite beam but does not teach a protective cover for such a beam. Because composite and metal structural elements have quite different coefficients of thermal expansion, such differences must be accommodated when ever metal and composite materials are coupled.

BRIEF SUMMARY OF THE INVENTION

In a first aspect, the invention provides a linear, structural beam comprising:
 a) a carbon fiber composite core,
 b) an outer jacket encasing the core, and
 c) an elastomeric means between the core and the jacket.

Preferably, the carbon fiber composite core is comprised of one or more unidirectional or bidirectional linear carbon fiber groups set in a first polymeric material to form a carbon fiber composite matrix. The jacket is composed of a metallic or polymeric material, other than a carbon fiber composite material, that can be fitted with one or more means for attachment to other structural elements. There are reinforcing caps at each end of the core, and optionally a plurality of reinforcing collars attached to the core and elastomeric material between the caps, collars, and core and the jacket.

More preferably, the core is further comprised of a plurality of composite matrices wherein each matrix is bonded to its adjacent matrix or matrices by a second polymeric material, which may be the same or different from the first polymeric material; the jacket is comprised of metal or metal alloy; and the elastomeric means is essentially continuous elastomeric material between the caps and the jacket, and the core and jacket.

Most preferably, the second polymeric material is an epoxy polymer: and the jacket is comprised of aluminum or an alloy thereof, steel or similar iron alloy, or copper or an alloy thereof. When the jacket is steel, preferably, it is high strength steel and may be stainless steel, or galvanized steel. In all case, where the jacket is a metallic it may optionally bear one or more polymer coats including one or more coats of paint.

In one specific embodiment, the core is comprised of a plurality of bidirectional linear carbon fiber groups set in an epoxy polymer and bound to each other with an epoxy polymer, the jacket is stainless steel having a rectilinear cross section with brackets at each end for attachment to other structural elements, and an elastomeric material filling essentially all the space between the caps and the jacket, the collars and the jacket, and the core and the jacket.

The second aspect is a method of making the beam of the first aspect. The third aspect is a building, a civil engineering project, item of machinery, an aircraft, a vessel, or a vehicle incorporating one or more linear, structural beams of the first aspect.

DETAILED DESCRIPTION OF THE INVENTION

Figure 1:
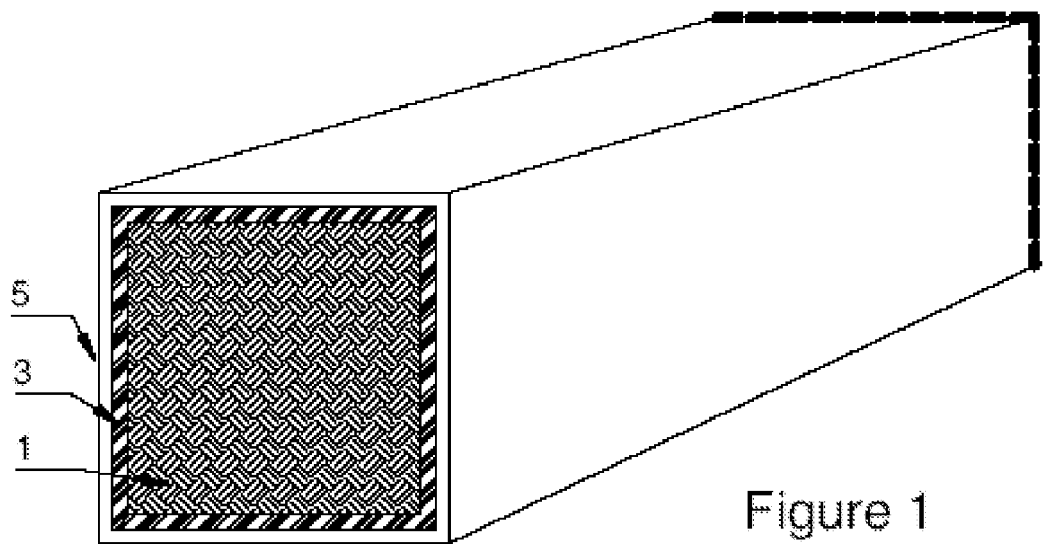
FIG. 1 is a cross sectional view of the present beam perpendicular to its longitudinal axis.

This invention is susceptible to embodiments in many different forms, and the present disclosure of such embodiments is to be considered as examples of the principles and not intended to limit the invention to the specific embodiments shown and described. In the description below, like reference numerals are used to describe the same, similar or corresponding parts in different views of the drawings.

The terms "a" or "an", as used herein, are defined as one or more than one. The term "plurality", as used herein, is defined as two, or more than two. The term "another", as used herein, is defined as at least a second or more. The terms "including" and/or "having", as used herein, are defined as comprising (i.e., open language).

As used herein, the following terms have the meanings indicated;

A beam means a rigid structural element having a longitudinal axis that is substantially longer than its latitudinal axis. The use of the term "beam" herein is constituent with general use of the term. A beam may be solid, have a hollow core, or have a core that is filled with a material that is different from outer material of the beam. Typically, as used herein, a beam is used to provide support in a substantially horizontal context and, thus, carries a load along its longitudinal axis.

A column means a structural element having substantially the same features as a beam but is used in substantially a vertical context and, therefore, bears a load along its latitudinal axis. The beams taught herein may also be used as column.

Composite means carbon fibers in a polymeric matrix. The carbon fibers may be oriented unidirectional or multi-directionally.

Curing is a process for transforming a material from one form to a more suitable form for a particular application. For example, multiple layers of carbon fibers in certain resin matrices may be cured, i.e., transformed, by heating, into a single, solid matrix.

Elastomeric material is a solid material that can be stretched or compressed relative to its surrounding, rigid material. Examples of elastomeric materials include rubber and plastic.

As noted in the Background section, carbon fiber composite beams have the desirable attribute of a high strength to weight ratio, but are subject to severe damage from cuts, abrasions, and extended exposure to sun light. The present invention is a structural beam having at least one composite core within a hollow beam of metal or polymeric material, i.e. a jacket, and a layer of elastomeric material between the composite core and the inner walls of the metal or polymeric jacket. This structural beam also may be fitted with brackets or holes at its ends and points along its length to allow attachment to other building elements. The present beam provides a synergism between the properties of its composite core and the metal or polymeric jacket. That is, the beam is stronger than either its core or jacket taken separately, and the jacket protects the composite core from cuts and abrasions while providing a means, directly or indirectly, of joining the beam to other structural elements. The elastomeric means between the core and jacket allow for the different rates of expansion and contraction between the core and jacket.

Figure 2:
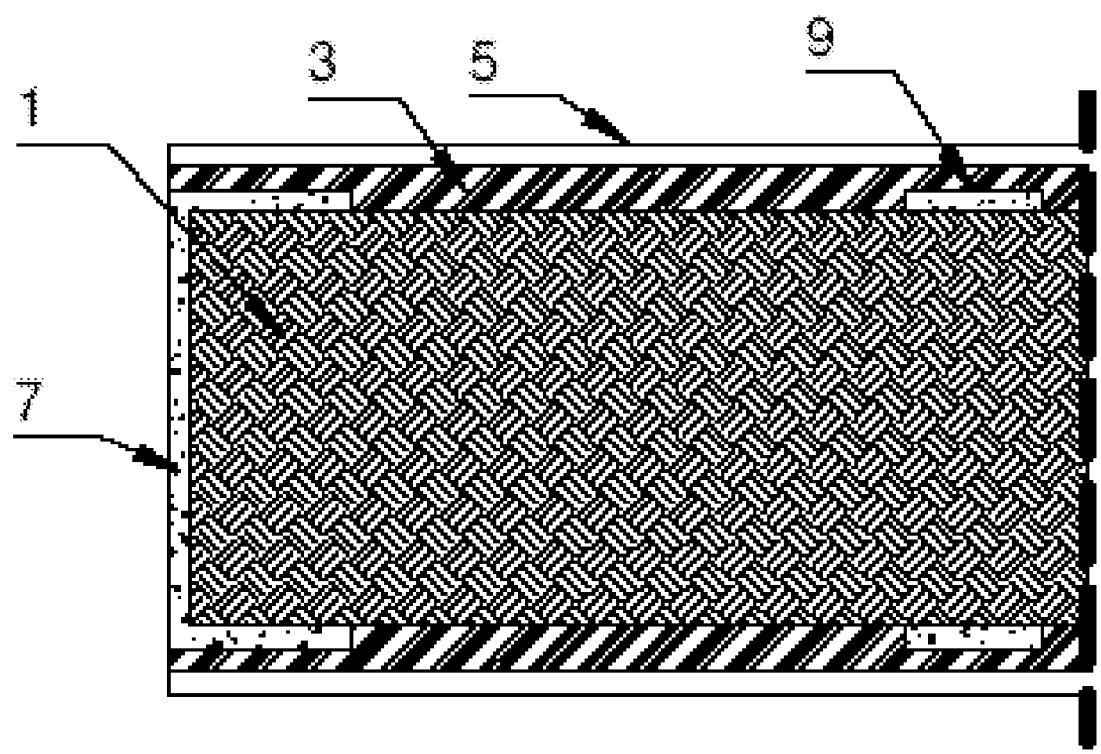
FIG. 2 is a cross sectional view of the present beam parallel to its longitudinal axis and showing one end cap.

FIG. 1 is a cross sectional view of the basic form of the present beam perpendicular to the beam's longitudinal axis. Core 1, a carbon fiber composite, is encased in protective sheath of elastomeric material 3, which, in turn, is encased in jacket 5. FIG. 2 is a cross sectional view of the beam along its longitudinal axis showing one end. (The heavy dashed line indicates that part of the length of the beam is not shown.) In addition to core 1, elastomeric material 3, and jacket 5, note end cap 7 and one of the collars 9 around the core. Each end cap 7 covers one end of core 1 and wraps around the side as the drawing shows. The end caps 7 provide protection to the ends of core 1 and provide a means to reinforce holes through the ends of the beam for inserting bolts and the like.

Jacket 5 may be metal or polymeric material. Typically, metal suitable for fabrication of the jacket may be any metal used in the art for structural elements, such as iron alloys, e.g. carbon steel and stainless steel, or aluminum and alloys of aluminum. For specialty applications, copper and its alloys, e.g. brass and bronze; titanium; Monel brand of nickel alloy; and the like may be used. Further, coated or plated metal, such as galvanized steel and copper plated steel, may be desirable in certain applications such as when the beam is exposed to the weather or other hostile elements and the strength of steel in required. Polymeric jacket materials include, but are not limited to, polyacrylic, polyester, polyvinyl chloride, polyamide, and the like, with or without reinforcing materials. Also within the scope of the invention is a metal jacket coated with one or more polymers.

The cross section of the jacket may be that of any of the hollow structural beam. Typically, the cross section is rectilinear, such as that found in a "box" beam as depicted in FIG. 1, but may also be another closed geometric figure such as a circle, triangle, pentagon, hexagon, etc. When the present beam is used as a column, i.e. in a vertical context, a circular cross sectional for jacket 5 may be desirable for aesthetic reasons. Further, a circular jacket 5 may have exterior fluting, and may even be tapered toward one end to simulate a classical architectural form.

Jacket 5 may also have multiple hollow cross sections to provide multiple cavities in jacket 5 for multiple composite cores. For example, two "I" beams might be joined, e.g. welded, at their flanged edges to produce a double "I-H" beam as jacket 5 having one cavity. In effect, this creates a box beam with flanges. Further, two double "I-H" beams may be stacked and joined. Of course, beams having one or more cavities may also be fabricated by casting, extruding, or milling.

Core 1 may be prepared by any means known in the art for fabricating composite carbon fiber matrices. The materials for fabricating carbon fiber matrices are commercially available, e.g. Hexel, 281 Tresser Blv., Stamford, Conn. 06901, USA. Conveniently, thin strips of composite material are cut to width slightly narrower than the width of the cavity into which they will be inserted to accommodate the protective elastomeric material that will be placed between the outer surface of the composite core 1 and the inner surface of cavity to form protective shield of elastomeric material 3 around composite core 1. For example, if the cavity is two and one half inches wide, the strips might be from about two and a quarter inches to about two inches wide. The length of strips is the length of the cavity of jacket 5.

Conveniently, a mold having the dimension of the cavity in the jacket less the clearance space for shield of elastomeric material 3 is used to assist in building up the layers of the composite. This mold is essentially a trough having a bottom, two ends, and sides the length of the cavity to be filled. When the mold is filled to its top with the composite strips, the bundle of composite strips, i.e., core 1, will be the appropriate size to fill the cavity in jacket 5 with space for the elastomeric material 3.

To build core 1, a strip of the composite is placed in the bottom of the mold and on top of that strip is placed another strip, upon which is place another, and so on until layers of composite strips are at the top or the mold. The mold containing the layers of composite is then cured. The curing process depends on the type of composite material being used, and the manufacturer's instructions for the particular composite being used should be faithfully followed. For example, some manufacturers provide sheets of composite that have a binding resin as an integral part, and curing requires heating the built-up core to a prescribed temperature for a prescribed time. Some other manufacturers supply the carbon fiber composite sheet that requires a layer of resin between each layer of composite. Typically, the resin is a two part material that cures a certain time after the two parts have been mixed. A good example of this type is the widely used epoxy resin where two liquid components are mixed and after a prescribed time, a hard solid is formed.

After curing, composite core 1 is removed from the mold and fitted with end caps 7 and, optionally, one or more collars between the end caps. The end caps and collars typically are comprised of the same or similar material as jacket 5. The end cap protects the end of the core and facilitates connecting the present beam to other structural members. Likewise, the collars facilitate connections that may be needed along the length of the beam. The end caps and collars have substantially the same shape as the cross section of the cavity being filled, but their dimensions are slightly less than those of the cavity to allow the elastomeric shield 3 to extend between the outer surfaces of the end caps and collars and the inner walls of the cavity as may be observed in FIG. 2.

Core 1 fitted end caps and collars is placed inside the cavity and small spacers are placed around each end cap to center the core within the cavity so that the core does not come in contact with the inner walls of the jacket, i.e., the walls of the cavity. The liquid elastomeric composition is pumped into the space between the core and the walls of the cavity. Upon curing, the liquid elastomeric composition becomes the solid elastomeric shield 3 around the core 1. Conveniently, curing of the elastomeric composition is catalytically initiated. However, other elastomeric systems with different curing processes may be used. Elastomeric shield 3 protects the core 1 from chafing against the inside of the jacket 5, allows the core and jacket to expand and contract independently without internal damage to core 1, and keeps the core centered within the jacket.

Figure 3:
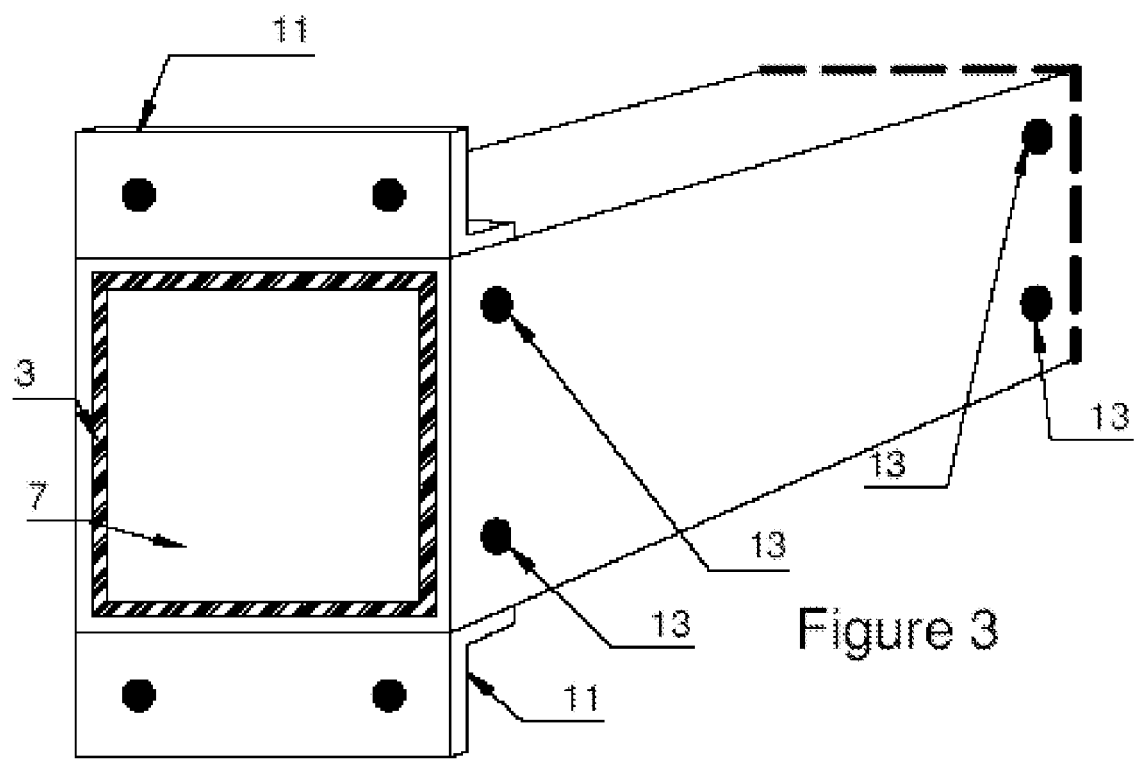
FIG. 3 illustrates two means for coupling the present beam to other structural members.

The beam of this invention may be provided with a means of attaching the beam to other structural members. For example, as shown in FIG. 3, the beam may be fitted with a system of brackets 11 with bolt holes, so that the beam may be welded, bolted, or the like. Reinforced holes 13 through the entire beam, i.e. jacket 5, shield 3, and core 1 and passing through the end caps 7 or through one of the collars 9 through which pins, hooks, screws, or bolts may pass provide another means of attachment. Where the beam has flanges, the flanges may be bolted or welded as a further means of attachment. In some cases, it may be advantageous to employ brackets, through holes, and flanges in combination to facilitate attachment.

The beam of this invention may be used in a manner as beams of the art such as in building construction, civil engineering project, machinery, aircraft, vessels, and vehicles. Because the present beam's strength to size ratio is greater than steel or aluminum, it can be used in applications where strength is required, but there are constraints on size or weight that would preclude beams of steel or other traditional materials. Additionally, certain embodiments of the present invention, such as those wherein the jacket is stainless steel, galvanized steel, or aluminum, may be used in severe weather conditions and even under water. The present beam is particularly useful in aerospace vehicles where strength is critical but weight is a constraint.

EXAMPLE

Preparation of a Steel Jacketed, Unidirectional Epoxy Carbon Fiber Matrix Beam

Step 1. Two 304/304L ANN stainless steel "I" beams each having a height of 4.00 inches, a width of 2.66 inches, and a length of 108.00 inches were placed on their sides with the top and bottom the edge of the flanges touched. A 19 degree bevel was milled lengthwise in each of the adjoining flanges and the two beams were welded along the bevel edges to form a double beam having a width of 5.32 inches. Excess steel along the weld lines was removed by surface grinding to give a double beam, which was 4.0 inches high, 5.32, and 108.0 inches long. Welding the beam in this manner created a rectangular cross sectional tube where the two beams met. Mounting brackets were welded to each end of the double beam to provide a means whereby the double beam might be bolded, welded, or other wise attached to other structural members. Forming a double beam in this manner created a rectangular, tubular core to be filled with carbon fiber composite in subsequent steps.

Step 2. Strips of HexPly 8552 amine cured, unidirectional, epoxy carbon fiber matrix (supplied by Hexel, Stamford, Conn.) were cut in uniform 2 inch wide and 108 inch long strips. The HexPly matrix was stored and processed in accordance with the manufactures recommendations. Each strip was placed atop the previous strip in a 2.0 inch wide, 3.0 inch high, and 108 inch long form until the form was completely filled to form a carbon fiber matrix beam. Filling required approximately 220 strips. The filled form was placed into an autoclave, and the temperature was increased from ambient to approximately 250° F. at a rate of 3° F./min then increased to, and maintained at, 350° F. The curing process took about eight hours as the manufacturer recommends compensating for the thickness of the stack of matrix strips.

Step 3. After curing and cooling, the carbon fiber matrix core (2.0" W, 3.0 H, and 108.0" L) was removed from the mold fitted with end caps and a collar (each approximately 0.125" thick steel) and placed in the center of the approximately 2.5" W, 3.5" H, and 108" L cavity of the double beam prepared in Step 1. Spacers were used at each end of the core of the double beam to center the carbon fiber matrix beam within the core and allow approximately 0.25" annular space between the matrix beam and the walls of the core. A liquid rubber composition (PMC-790 Industrial Liquid Rubber Compound manufactured by Smooth-on) was injected in the annular space completely filling it, and this composition was cured as recommended by the manufacturer to form a solid elastomeric rubber jacket between the matrix beam and the walls of the core of the double beam.

What is claimed is:

1. A linear, structural beam comprising:
   a) an interior core that is filled with a carbon fiber composite,
      wherein, there are caps at each end of the core, and one or more collars attached to the core,
         wherein the caps and collars are comprised of a metallic material
   b) a protective outer jacket encasing the core, and
   c) an elastomeric rubber material between the interior core and the jacket that allows the core and jacket to move independently.

2. The beam of claim 1 wherein the carbon fiber composite core is comprised of unidirectional or bidirectional linear carbon fibers set in a first polymeric material to form a carbon fiber composite matrix and the beam has a cross sectional configuration that is a closed polygon.

3. The beam of claim 2 wherein the carbon fiber composite core is comprised of a plurality of composite matrices wherein each matrix is bonded to its adjacent matrix or matrices by a second polymeric material, which may be the same or different from the first polymeric material.

4. The beam of claim 3 wherein the second polymeric material is an epoxy polymer.

5. The beam of claim 1 wherein the jacket has one or more brackets affixed to the jacket or one or more holes in, or through, the jacket to allow affixing of pins, hooks, screws, rivets, or bolts into, or through, the jacket for attachment to other structural elements.

6. The beam of claim 5 wherein the brackets are comprised of a metal that can be welded.

7. The beam of claim 1 wherein the jacket is comprised of a metal or polymer.

8. The beam of claim 7 wherein the jacket is comprised of a metal.

9. The beam of claim 8 wherein the metal of the jacket is aluminum or an alloy thereof, steel, or copper or an alloy thereof.

10. The beam of claim 8 wherein the metal of the jacket is steel.

11. The beam of claim 10 wherein the steel is stainless, galvanized, or polymer coated.

12. The beam of claim 9 wherein the metal of the jacket is aluminum or an alloy thereof, which is anodized or coated with one or more polymers.

13. A method of fabricating the beam of claim 1 comprising the steps of
   a) building a core of carbon fiber composite material,
   b) fitting the core with end caps at each end of the core and one or more collars attached to the core,
      wherein the caps and collars are comprised of a metallic material
   c) inserting the core with end caps and collars into the cavity of a protective outer jacket,
      wherein there is a space between the core and the outer jacket; the end caps and the outer jacket; and the collars and the outer jacket, and
   d) filling the space between the core and the outer jacket; the end caps and the outer jacket; and the collars and the outer jacket with an elastomeric rubber material.

14. A building, civil engineering project, item of machinery, aircraft, vessel, or vehicle incorporating one or more linear, structural beams each comprising:
   a) an interior core that is filled with a carbon fiber composite,
      wherein, there are reinforcing caps at each end of the core, and one or more reinforcing collars attached to the core,
      wherein the caps and collars are comprised of a metallic material
   b) a protective outer jacket encasing the core, and
   c) an elastomeric rubber material between the interior core and the jacket that allows the core and jacket to move independently.

* * * * *